US006864614B2

(12) United States Patent
Murray

(10) Patent No.: US 6,864,614 B2
(45) Date of Patent: Mar. 8, 2005

(54) PERMANENT MAGNET ELECTRIC GENERATOR

(76) Inventor: David Murray, 7 Greenville St., Roxbury, MA (US) 02119

( * ) Notice: Subject to any disclaimer, the term of this patent is extended or adjusted under 35 U.S.C. 154(b) by 275 days.

(21) Appl. No.: 10/438,989

(22) Filed: May 16, 2003

(65) Prior Publication Data

US 2004/0227425 A1 Nov. 18, 2004

(51) Int. Cl.[7] .............................. H02K 1/00; H02K 1/12
(52) U.S. Cl. ....................... 310/216; 310/254; 310/194; 310/218; 310/184
(58) Field of Search ................................ 310/179, 180, 310/184, 254, 218, 208, 216, 156.08, 156.56

(56) References Cited

U.S. PATENT DOCUMENTS

| | | | |
|---|---|---|---|
| 1,726,042 A | | 8/1929 | Reis |
| 2,323,114 A | * | 6/1943 | Wener et al. ............... 310/218 |
| 3,427,486 A | * | 2/1969 | Whitney ..................... 310/180 |
| 3,845,835 A | | 11/1974 | Petit |
| 4,112,320 A | | 9/1978 | Mohr |
| 4,237,397 A | | 12/1980 | Mohr et al. |
| 4,292,558 A | | 9/1981 | Flick et al. |
| 4,348,628 A | | 9/1982 | Loucks |
| 4,547,758 A | | 10/1985 | Shimizu et al. |
| 4,751,415 A | | 6/1988 | Kitamori et al. |
| 4,758,756 A | | 7/1988 | Pouillange |
| 4,780,634 A | | 10/1988 | Masterman |
| 4,818,911 A | * | 4/1989 | Taguchi et al. ............. 310/259 |
| 5,365,137 A | * | 11/1994 | Richardson et al. ........ 310/258 |
| 5,457,870 A | | 10/1995 | Canders |
| 5,608,279 A | * | 3/1997 | Murray ................... 310/156.43 |
| 6,049,153 A | * | 4/2000 | Nishiyama et al. ..... 310/156.53 |
| 6,188,157 B1 | * | 2/2001 | Tajima et al. .......... 310/156.11 |
| 6,204,584 B1 | * | 3/2001 | Muszynski ............. 310/156.08 |
| 6,274,957 B1 | * | 8/2001 | Mahn et al. ................... 310/89 |
| 6,373,161 B1 | * | 4/2002 | Khalaf .................... 310/154.02 |
| 6,487,770 B1 | | 12/2002 | Bernauer et al. |
| 6,525,437 B1 | | 2/2003 | Ozawa et al. |
| 2002/0195900 A1 | | 12/2002 | Horng et al. |

FOREIGN PATENT DOCUMENTS

| | | |
|---|---|---|
| JP | 3-82348 | 8/1991 |
| JP | 2002-272072 | 9/2002 |
| WO | WO 02/099950 | 12/2002 |
| WO | WO 03/012955 | 2/2003 |

* cited by examiner

*Primary Examiner*—Burton S. Mullins
*Assistant Examiner*—Yahveh Comas
(74) *Attorney, Agent, or Firm*—Richard C. Litman

(57) ABSTRACT

The permanent magnet electric generator includes a plurality of ferromagnetic bars disposed in spaced apart relation about the circumference of a non-magnetic, annular rotor body circumferentially surrounded by an even plurality of stator rows uniformly distributed around and arranged normal to the rotor. Each row of stators has a plurality of interconnected stators, each stator having a nonconductive innermost core surrounded by ferromagnetic material and successive layers of insulation, windings of conductive wire, and layers of ferromagnetic material circumferentially surrounding the underlying layers in a pre-determined repeating pattern.

7 Claims, 9 Drawing Sheets

PERMANENT MAGNET ELECTRIC GENERATOR

BACKGROUND OF THE INVENTION

1. Field of the Invention

The present invention relates generally to electric power generators. More specifically, the present invention relates to permanent magnet electric generators.

2. Description of the Related Art

The basic construction of electric power generators has not changed significantly over the years, taking the form of a rotating a magnetic within a ring of wound wire. Improvements in construction for increasing the efficiency of the generator have been the object of much research and innovation.

U.S. Pat. No. 1,726,042, issued to Reis in 1929, discloses a generator having a rotor having permanent magnets. These magnets are at least partially encircled with ferromagnetic metal to control eddy currents and to increase permeability of local portions of the magnetic field.

U.S. Pat. No. 5,447,758, issued to Shimizu in 1985, discloses a cylindrical permanent magnet having at least eight poles.

U.S. Pat. No. 4,780,634, issued to Masterman in 1988, discloses an electric generator having a rotor, a plurality of pole sections spaced around the circumference of a rotor core at a constant pole section pitch, a toothed stator (a stationary part in a machine in or about which a rotor revolves), two or more independent windings, and a plurality of bridge members to separate adjacent windings.

Japanese Patent Document No. 3-82348, published in 1991, discloses a rotor for a generator wherein the magnetic field is augmented by a second series of magnets placed inside an external ring of primary magnets.

U.S. Pat. No. 5,457,870, issued to Canders in 1995, discloses an improved rotor for electric machines having a high rotational speed. The rotor described in the '870 patent has a rotor core and a rotor shell comprising a binding made of fiber-reinforced plastics radially supporting the rotor core.

Advances in rotor and stator design have been disclosed in several devices. U.S. Pat. No. 6,487,770, issued to Bernauer et al. in 2002, discloses rotors or stators cut out from rolled sheet metal with a predominant magnetic direction and which are stacked to form a rotor or stator lamination bundle. Furthermore, a rotating electrical machine stator having improved heat dissipation due to the insertion of a silicon rubber sheet between a stator core and the stator windings is disclosed by U.S. Pat. No. 6,525,437, issued to Ozawa et al. in 2003.

High efficiency generators for powering motor vehicles are described in several devices and include: U.S. Pat. No. 3,845,835, issued to Earl W. Petit in 1974, and U.S. Pat. No. 4,348,628, issued to Loucks in 1982.

W.I.P.O Patent No. 03/012955, published in 2003, discloses a stator assembly for an electric rotating machine having a plurality of annular laminated core sections with an extending coolant duct provides increased cooling efficiency.

U.S. Pat. No. 5,608,279, issued to Murray (the present inventor) in 1997, discloses a permanent magnet generator with an improved rotor and stator. The '279 patent discloses a rotor having a pair of diametrically opposed magnet groups, each group consisting of curved magnets of unequal flux strength. Furthermore, at any one time only one set of magnets and stators is in alignment.

Japanese Patent No. 2002-272072, published in 2002, discloses a DC generator having a rotor having multiple two-pole magnets aligned along the rotor. A single stator is disclosed having armature windings around an integral number of three poles. The armatures are individually provided with a rectifier allowing the DC outputs of each winding to be obtained without need for a commutator or a brush.

U.S. Patent Application Publication 2002/0195900, published in 2002, shows a stator construction that utilizes a single piece of metal. In addition, W.I.P.O. Patent No. 02/099950, published in 2002, describes a rotor with magnets mounted at even intervals around the rotor.

The technology utilized in motors is similar to that of electric generators and includes a rotor and stationary windings. U.S. Pat. No. 4,751,415, issued to Kitamori et al. in 1988, discloses a brushless DC motor comprising a stator with plural exciting windings and a rotor made of a permanent magnet provided with a compensation winding wound in the stator and compensation magnetic poles disposed on the rotor. U.S. Pat. No. 4,237,397, issued to Mohr et al. in 1980, discloses a permanent magnet stator having two permanent magnet segments formed in an arc, each segment further comprising two subsegments.

U.S. Pat. No. 4,112,230, issued to Mohr in 1978, discloses an elongated magnet structure having zones of different magnetic properties for use in electric dynamos.

None of the above inventions and patents, taken either singly or in combination, is seen to describe the instant invention as claimed. Thus an improved power unit solving the aforementioned problems is desired.

SUMMARY OF THE INVENTION

The present invention is a permanent magnet electric generator which seeks to increase the efficiency of the generator by improving upon the rotor and stator. The present invention includes a rotor assembly having a plurality of ferromagnetic bars disposed in spaced apart relation about the circumference of a non-magnetic, annular rotor body circumferentially surrounded by an even plurality of stator rows uniformly distributed within a housing disposed around, and arranged normal to, the rotor assembly.

Preferably, the rotor assembly includes an even number of diametrically opposing magnets, adjacent magnets presenting opposite poles sequentially to the stators.

Each stator row has a plurality of interconnected stators, each stator comprising a combination of ferromagnetic core material, windings and insulation, having at is center a non-conductive planar base member sandwiched between two ferromagnetic planar members. Two layers of insulation are wrapped around the ferromagnetic planar members.

The stator is built up by applying a repeating pattern of layers, beginning with a winding of a single filament conductor in one direction around the underlying insulation layers and extending the length of the base member. An insulation layer is then applied and a second winding wound in the opposite direction. Two layers of insulation are next applied, and a band of ferromagnetic material, serving as a concentric core, is wrapped circumferentially around the double layers of insulation, completing the repeating pattern.

The stator is then built up by repeating the above pattern of windings, insulation, and cores in concentric fashion. Each winding is formed from a continuation of the previous winding, so that only one filament is employed to wind each stator. Core members are thus interspersed between every other winding, rather than being concentrated in the center of the stator. Two more insulation layers are wrapped around the last core layer and a final primary winding is wound around the insulation. A single insulation layer completes the buildup of the stator. An odd number of windings ensures that the two ends of the conductor extend from opposite sides of the stator, one end extending from the innermost winding, and the second end from the outermost winding.

Each stator is wired to the adjacent stators in a predetermined pattern. Every eight stators in a row are wired in parallel, such that the interconnected ends of the inner windings and the interconnected ends of their outer windings are presented to the adjacent groups of stators. Each group of eight stators is then wired in series with the next group, the outermost winding of one group being wired to the innermost windings of the next group. Each stator can supply a specific amount of current at a specific voltage, depending upon the construction of the stator and the rotational force of the magnet passing in front of the distal end of the stator. Parallel-wired stators increase the current producing capability of the generator, while the serially connected groups add voltage potential to the total output of the generator. A row of interconnected stators has two wires extending from it, one wire extending from the innermost winding of the first stator of the row, and a second wire extending from the outermost winding of the last stator.

Based upon the scientific principle that moving magnets create electric currents in closed circles of wire, electric energy is generated when the shaft of the rotor, rotationally coupled to a source of rotational energy, is rotated at high speed within the surrounding rows of stators. The rotor is potted in epoxy and banded circumferentially with wire to help retain the magnets in place at high rotational speeds.

Accordingly, it is a principal object of the invention to provide a more efficient electric generator.

It is another object of the invention to form a generator stator by adding successive layers of a repeating arrangement of windings, insulation, and magnetizable material.

It is a further object of the invention to provide a generator rotor wherein diametrically opposing magnets simultaneously present the same magnetic polarity to their respective stators.

Still another object of the invention is to provide a multi-phase electric generator with multiple output configurations.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
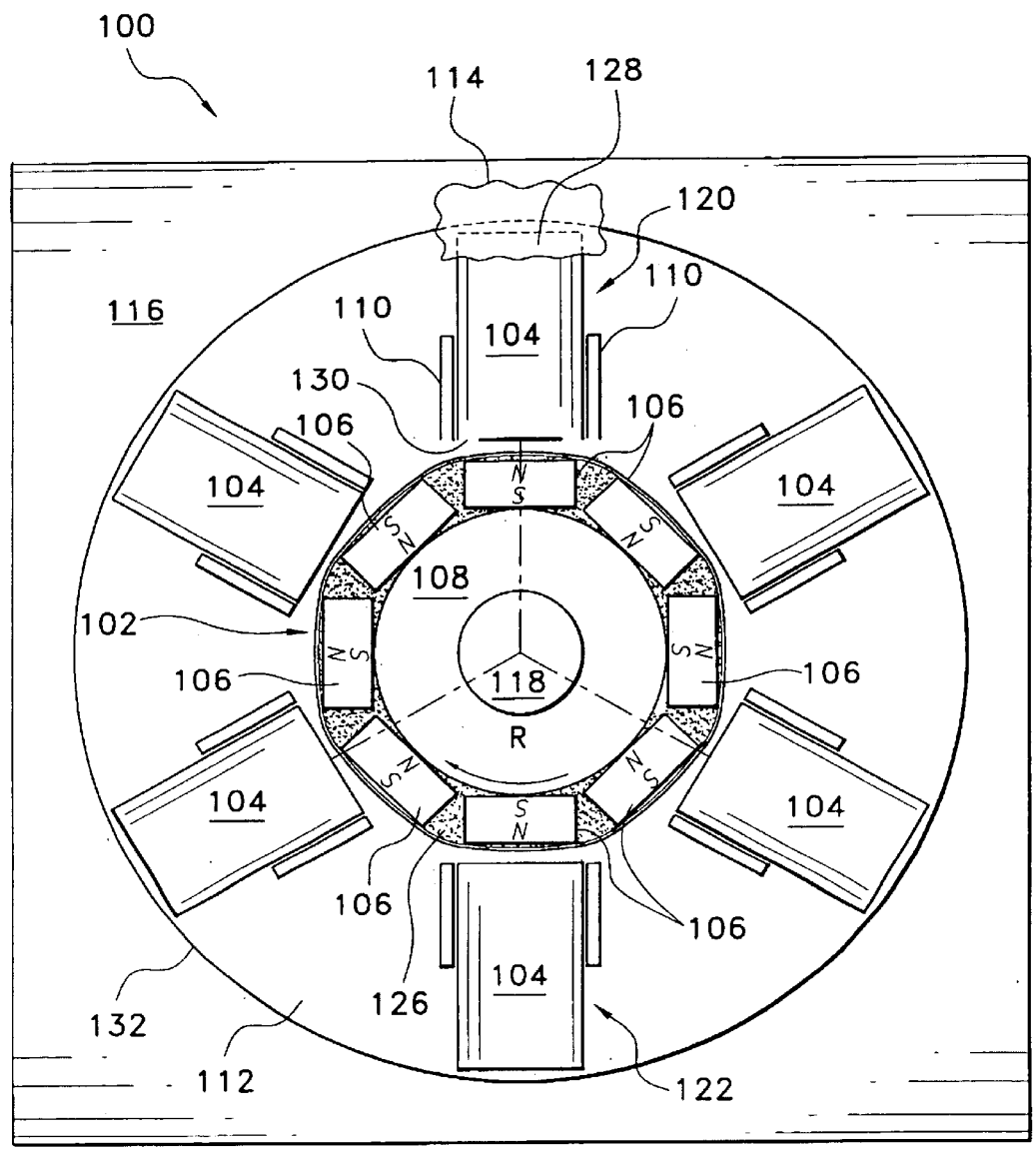
FIG. 1 is a front elevation view of a permanent magnet electric generator according to the present invention, shown partly in cross section.

The present invention is a permanent magnet electric generator, designated generally as 100 in the drawings. With reference to FIG. 1, the generator 100 is seen to include a rotor assembly 102 and three pairs of diametrically opposed rows of stators 104 arranged radially about rotor 102, all enclosed in a housing 116. The present embodiment, having three pairs of stator rows, has a three-phase voltage output, the actual voltage dependent upon the number of stators in each row and the rotational force of the rotor assembly 102. The precise number of stators 104 and can be varied to influence the output characteristics of generator 100 as desired.

The stators 104 comprising a row of stators are held in alignment by a pair of braces 110 epoxied to the stators 104. Each row of stators is firmly secured to housing 116 by epoxy potting 114, or by any suitable method. The stators 104 are mounted such that the proximal end 128 of each stator 104 is in close proximity to rotor assembly 102 at a fixed or static location within generator 100.

Figure 2A:
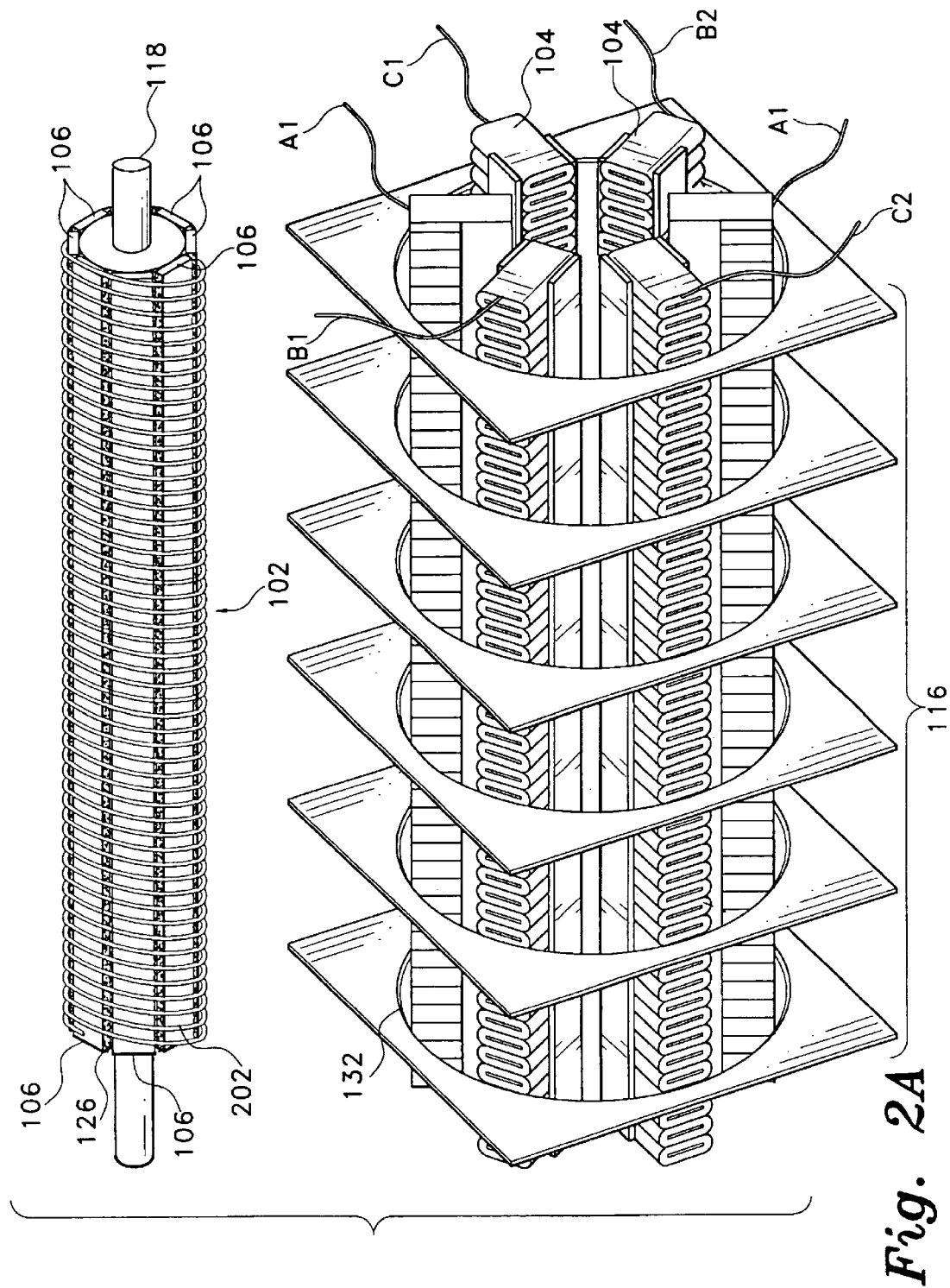
FIG. 2A is a perspective, exploded view of an permanent magnet electric generator according to the present invention.

As best shown in FIG. 2A, rotor assembly 102 includes a central shaft 118, an annular body 108 comprised of non-ferromagnetic material, and four pairs of diametrically opposed bar magnets 106 mounted normal to the circumference of the the annular body 108. The length of the rotor assembly 102 and of the magnets 106 mounted thereto, may be quite long, and is of a length approximately equal to the encircling rows of stators 104. The magnets 106 are epoxy potted 126 to the body and banded circumferentially with wire 202 to help retain the magnets 106 in place at high rotational speeds. The precise number of magnets 106 within a row is not important beyond a manufacturing concern, provided the polarity of the magnets 106 are in proper alignment and the length of the row of magnets is sufficient to energize the row of stators 104.

For the purposes of this disclosure, a row of magnets will be addressed as a single bar magnet 106, each magnet having a north pole and a south pole in alignment with a radius of the rotor assembly 102, such that adjacent magnets about the circumference of the rotor assembly 102 have outward facing poles of alternating polarity.

Figure 2B:
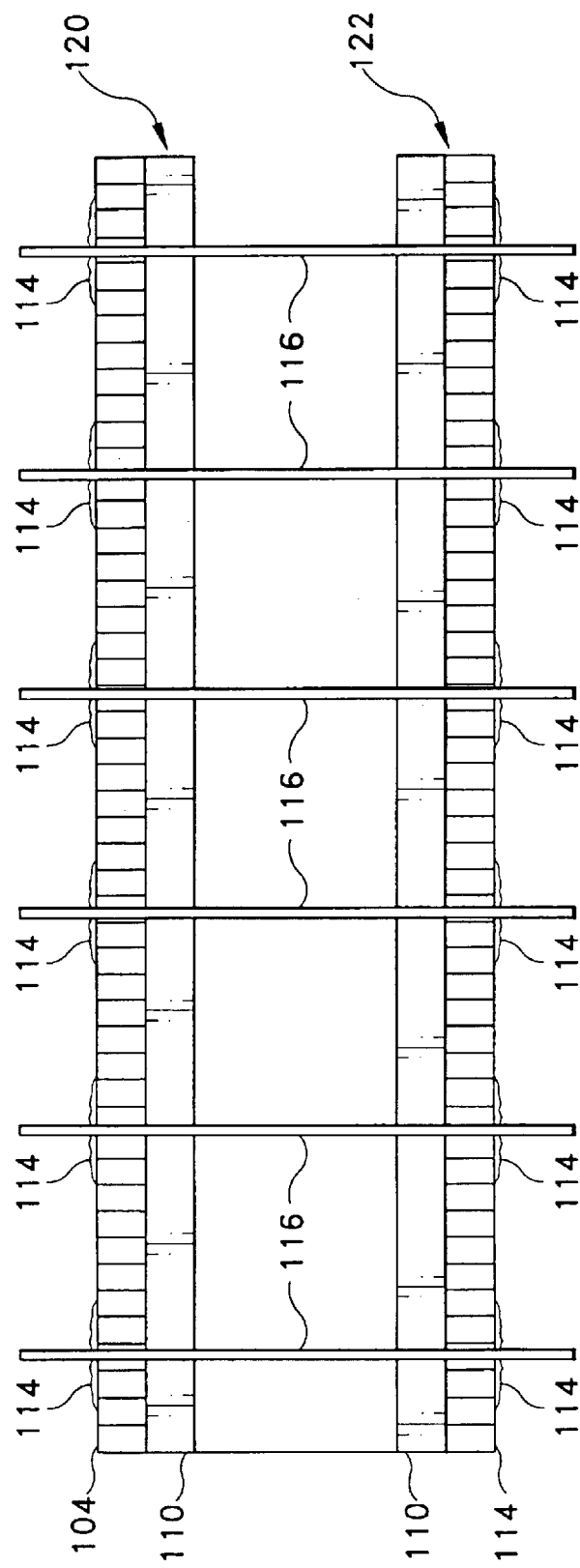
FIG. 2B is a side elevation view showing two rows of diametrically opposing stators and the housing supporting the rows of stators.

FIGS. 2A and 2B best illustrates the relationships among rotor assembly 102, stators 104, and the housing formed by a plurality of aluminum plates 116 uniformly spaced along the longitudinal axis of the rows of stators 104. The rows of stators are affixed to the inner edge 132 of a circular opening 112 cut in the middle of the plurality of housing plates 116. Also shown are shaft 118, which is common to both rotor 102 and to a source of high-speed rotational force such as a turbine (not shown) powered by gas, water, electric, or other source of energy. Also shown in FIG. 2A are leads A1, A2, B1, B2, C1, C2 extending from stator row windings to be further explained hereinafter.

Figure 3:
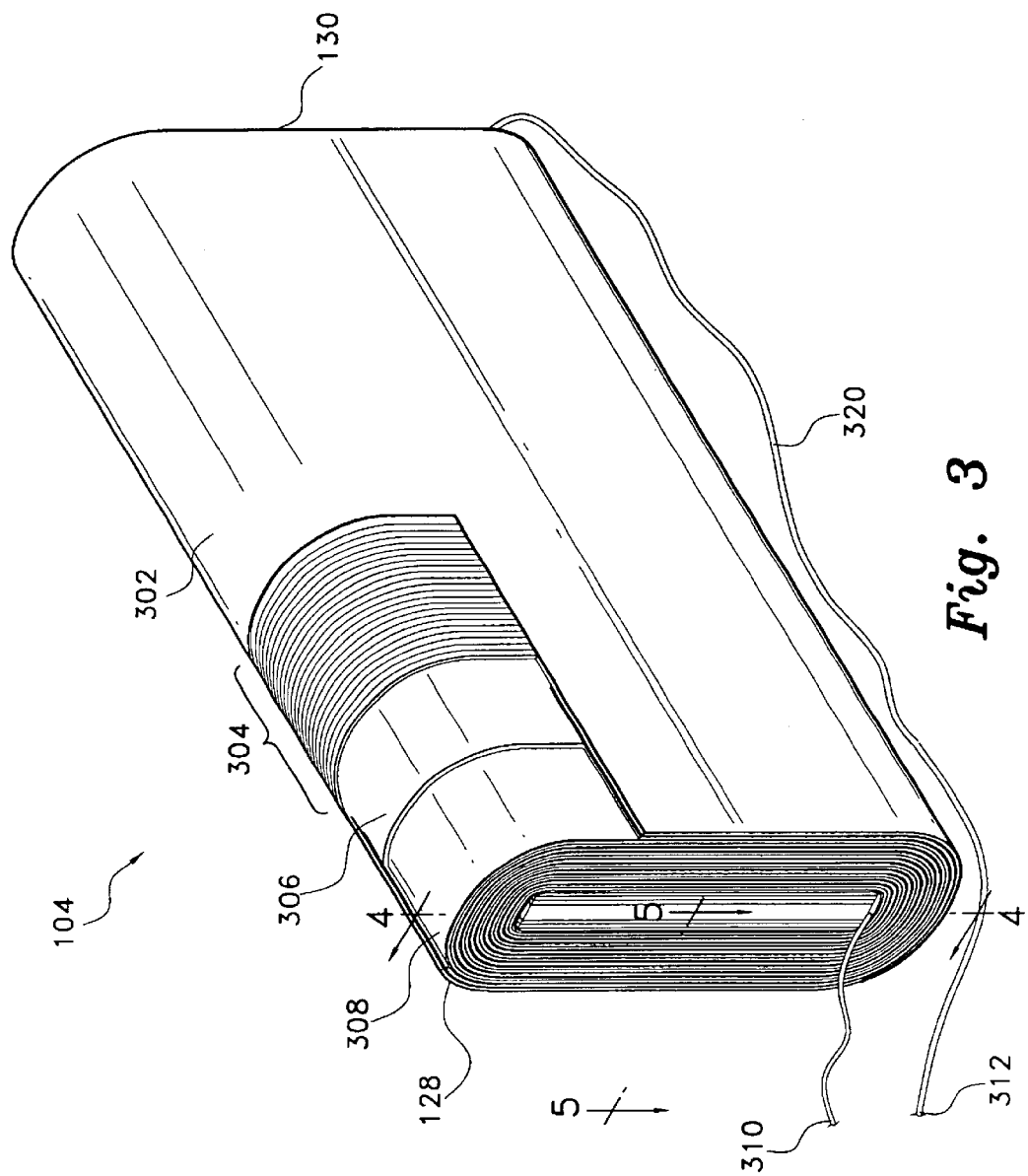
FIG. 3 is a perspective view of a stator according to the present invention, partly broken away to reveal several layers.

As shown in FIG. 3, each stator 104 has a proximal end 130 and a distal end 128 defining a longitudinal axis arranged normal to the rotational axis R of rotor 102, and conductor 320 that terminates at two ends 310, 312, for wiring to adjacent stators. Each stator is built upon successive layers, the outermost four layers of each stator 104 comprising an outer layer of insulation 302, a next winding of conductive wire 304, and two layers of insulation 306, 308 covering in turn the layers underneath.

Figure 4:
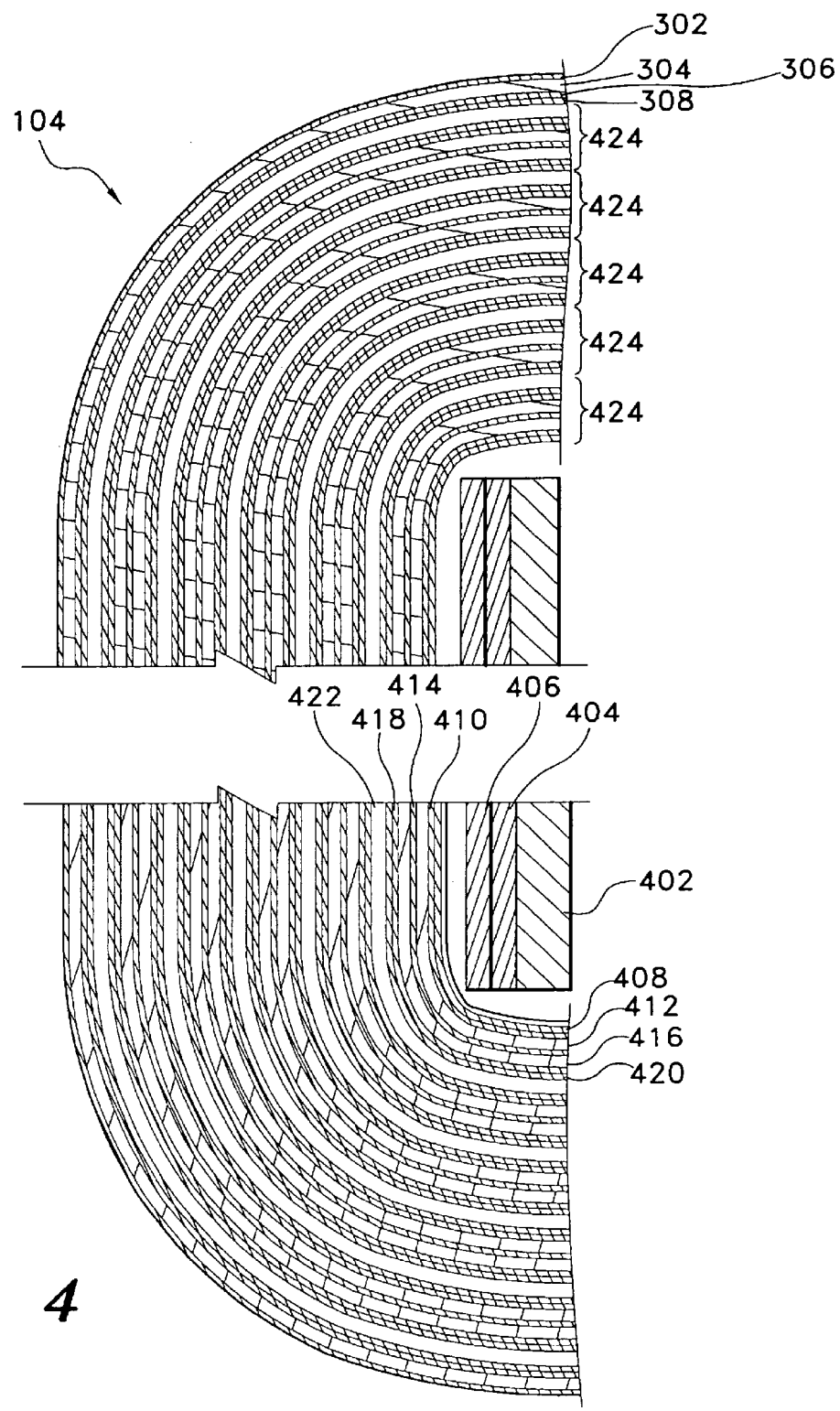
FIG. 4 is a side cross sectional detail view of the stator, drawn along lines 4—4 of FIG. 3, drawn to enlarged scale.
Figure 5:
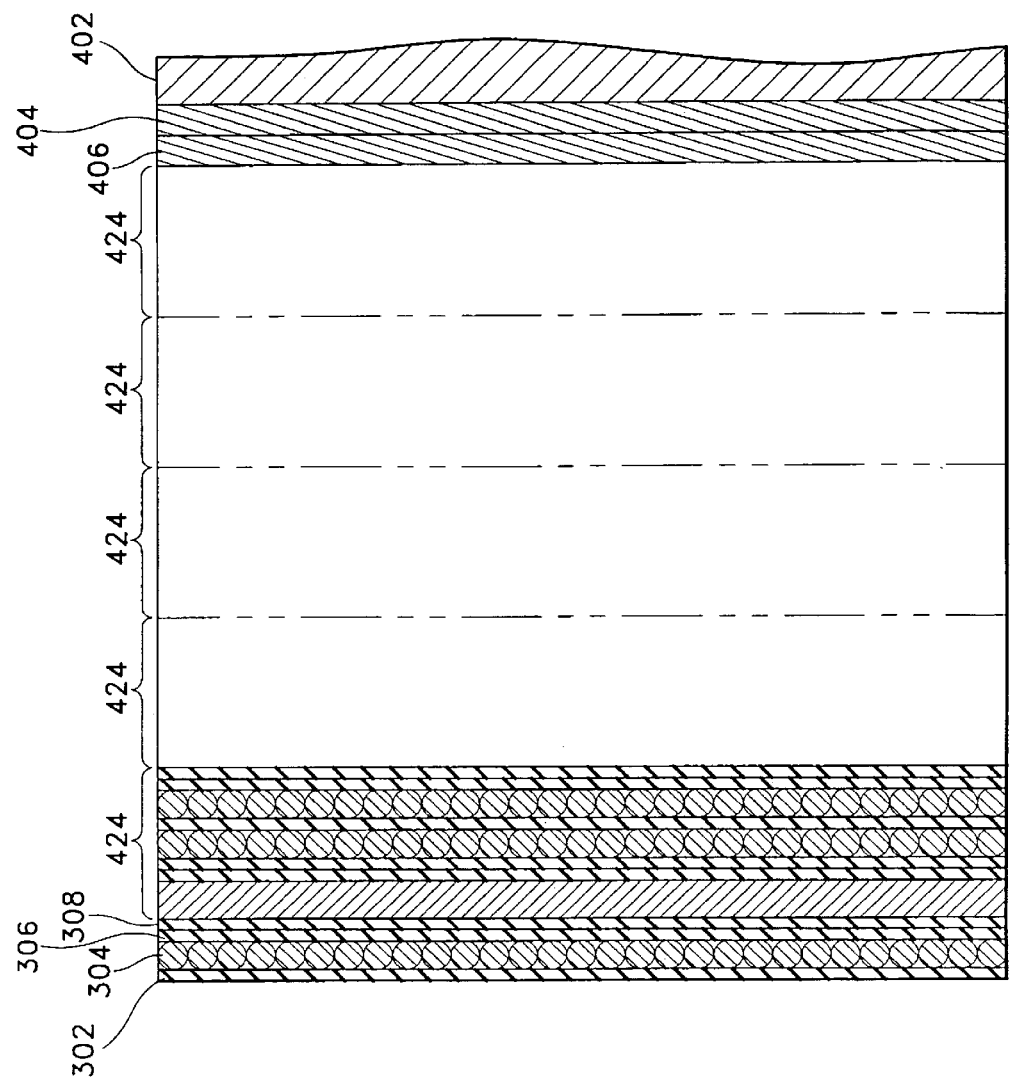
FIG. 5 is a top cross sectional detail view of the stator, drawn along lines 5—5 of FIG. 3, drawn to enlarged scale.

FIGS. 4 and 5 illustrate the preferred construction of a stator 104. A flat, non-conductive member 402 such as aluminum serves as a core against which two ferromagnetic metal plates 404, 406, of the same approximate size as the base member 402, abut each side of the base member 402. Two layers of insulation 408, 410 are then wrapped around the underlying metal layers, forming a base or foundation for winding conductor 320. Starting at stator proximal or outer end 128, conductor 326 is wound around insulating layer 410 in the direction of the stator distal or inner end forming a layer of windings 412. This innermost primary winding 412 is covered with a layer 414 of insulation. Conductor 320 is passed over insulation layer 414, and is then wound around insulation 414 to form a second primary winding 416 extending from the stator distal end 130 back to proximal end 128. A double layer 418, 420 of insulation is then placed over second primary winding 416. It will be appreciated that conductor 320 of each stator is a single conductive filament. A continuous layer of ferromagnetic core material 422 is then placed around insulation layer 420, circumferentially surrounding the underlying layers.

First and second primary windings 412, 416, combined with layer of ferromagnetic material 422, and associated insulation layers 408, 410, 414, 418, 420 comprise a repeating core assembly 424, forming a building block for a stator 104 having a plurality of concentrically arranged successive core assemblies 424. FIGS. 4 and 5 illustrate a stator 104 constructed from five successive core assemblies 424 which are circumferentially surrounded by two insulating layers 308, 306, a final winding layer 304, and final insulating layer 302. An odd number of winding layers, eleven in the present embodiment, ensure that end 312 of conducting wire 320 extends from the distal end 130 of final winding layer 304.

Figure 6:
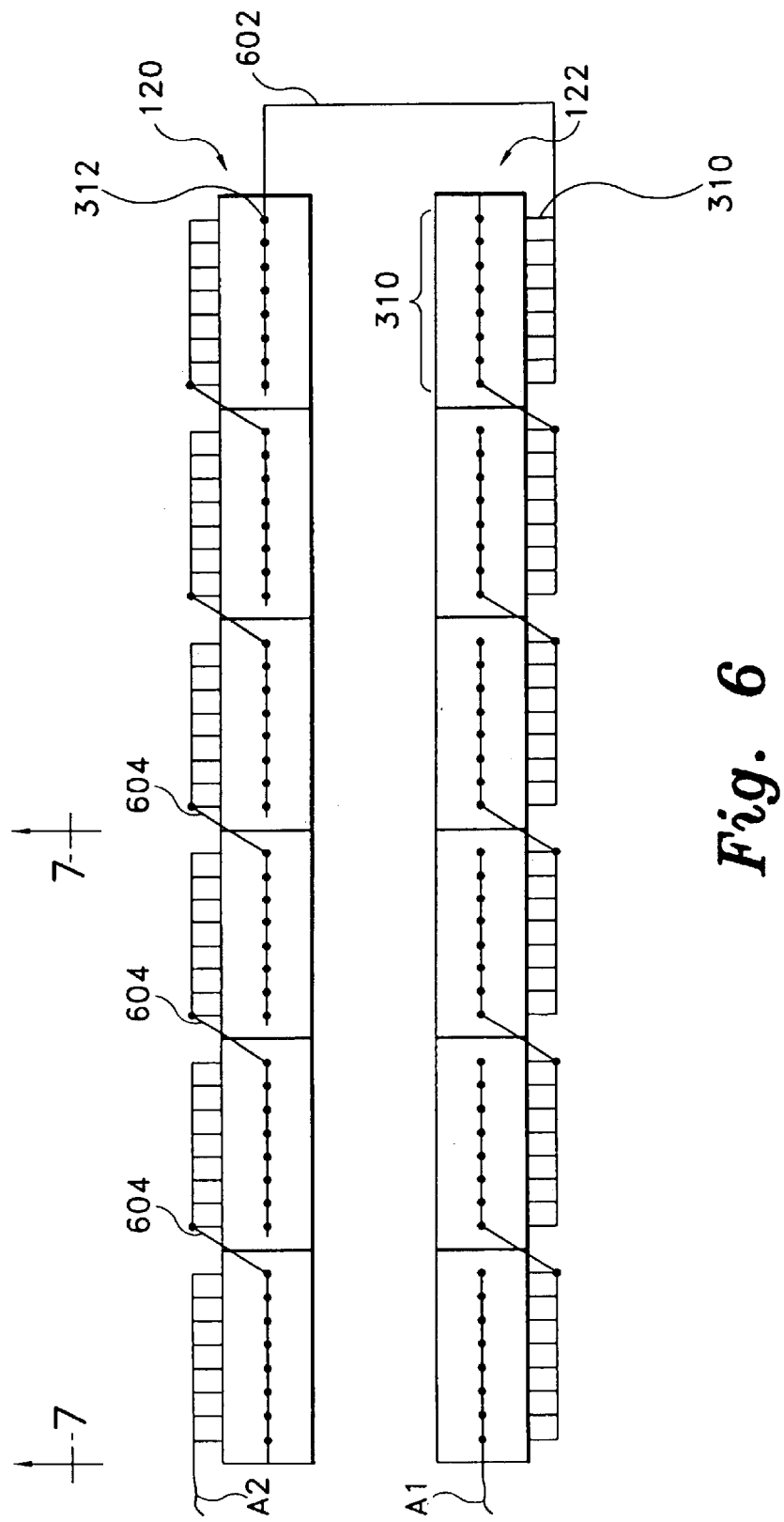
FIG. 6 is a side representative view of one pair of diametrically opposite rows of stators electrically connected according to the present invention.
Figure 7:
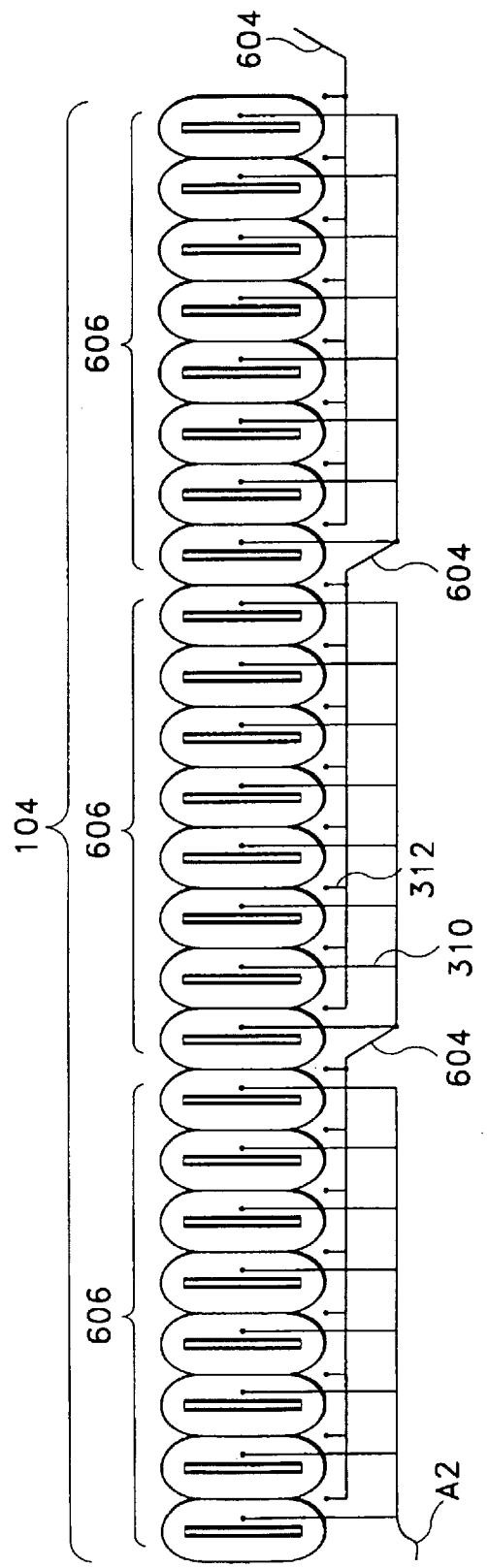
FIG. 7 is a top cross sectional detail view of one row of stators, drawn along lines 7—7 of FIG. 6, drawn to enlarged scale.
Figure 8:
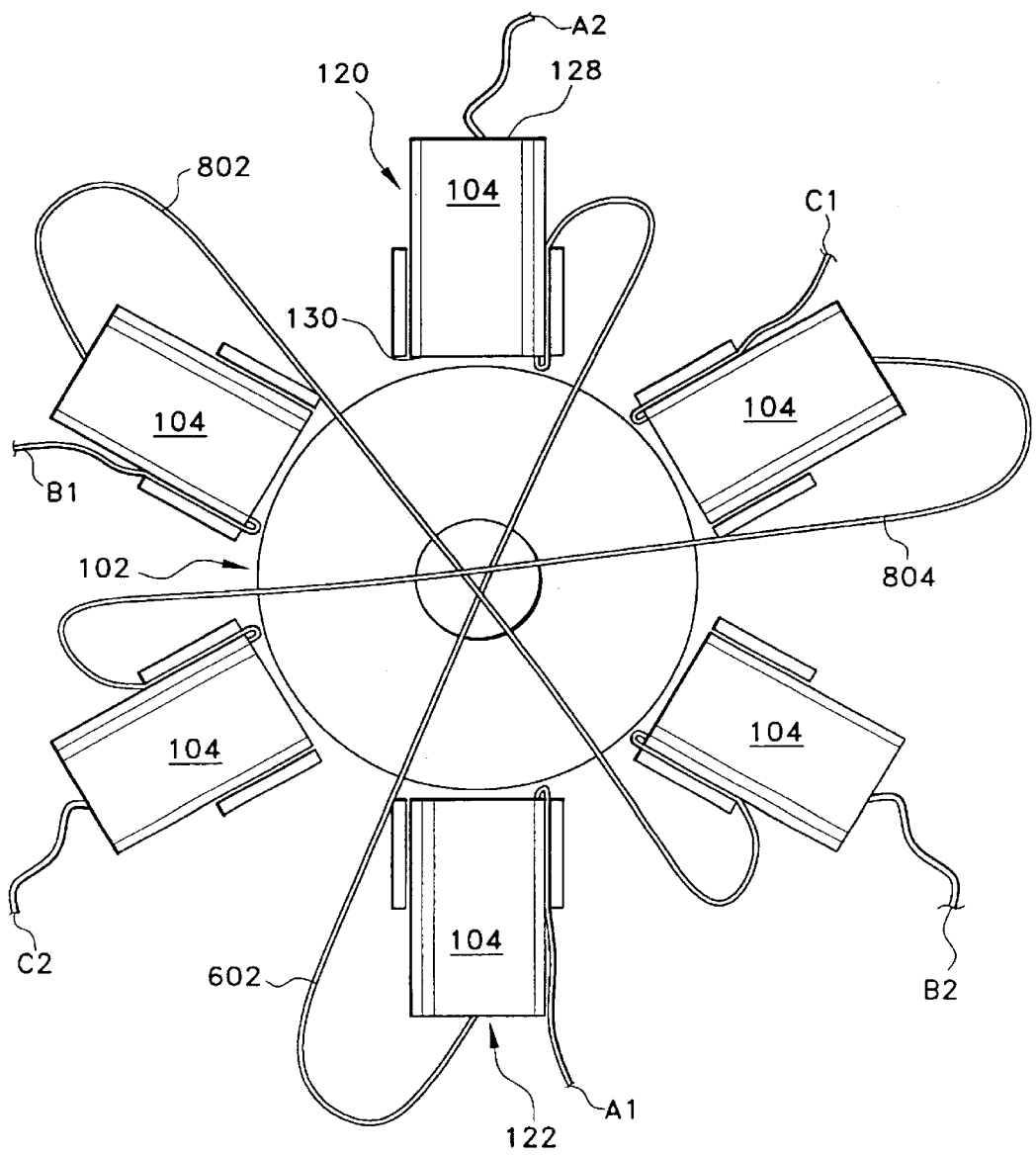
FIG. 8 is a front elevation view of the present invention showing generally, the electrical connection between the rows of stators according to the present invention.

The leads 310, 312 of the intra-row stators are wired in a predetermined pattern based upon the desired output characteristics of the generator 100. FIGS. 6-8 illustrate the electrical interconnection of a preferred generator 100 having six stator rows, each stator row having forty-eight stators 104.

FIG. 6 illustrates two diametrically opposed stator rows 102, 122 interconnected with jumper wire 602 serially connecting lead 312 extending from the distal end of the last stator in one row 120 to lead 310 extending from the proximal end of the last stator in opposing row 122. The output voltage generated from the diametrically opposed rows 120, 122 is presented on leads A1, A2.

As shown in detailed view FIG. 7, stators are arranged in groups 606 of eight stators 104, the eight stators are wired in parallel, their distally extending leads 312 wired in common, and their proximally extending leads 310 wired in common. Adjacent stator groups 606 are interconnected with a series connection 604, a distally extending lead 312 of one group connecting to a proximally extending lead of the next group.

FIG. 8 illustrates the electrical connectivity associated with the three pairs of stator rows, the two rows of each pair interconnected by a jumper wire 602, 802, 804. Finally, the output of the generator being presented on three pairs of leads A1–A2, B1–B2, C1–C2.

It will be apparent to those of skill in the art that the number of stators 104, magnets 106, and winding and core units 424 may be varied to suit the desired characteristics of generator 100. Furthermore, the relative size and precise configuration of these elements may similarly be varied.

It is to be understood that the present invention is not limited to the embodiments described above, but encompasses any and all embodiments within the scope of the following claims.

I claim:

1. An electric generator, comprising:
   a housing;
   a rotor assembly centrally disposed within said housing, the rotor assembly comprising an axially disposed annular rotor body having a circumference and a diameter, and a shaft rotationally coupled to a source of rotational energy, the rotor assembly further comprising an even plurality of magnets uniformly distributed about the circumference, each magnet having a north pole and a south pole along the diameter such that adjacent magnets about the circumference have outward facing poles of alternating polarity; and
   a plurality of stators, arranged in an even plurality of rows, each row secured within said housing at a static location with respect to and in close proximity to said rotor, the rows spaced equidistantly within said housing and radially about said rotor assembly, wherein each of said stators comprises:
      a proximate end adjacent to said housing and a distal end adjacent to said rotor assembly;
      a centrally disposed nonconductive plate having two substantially rectangular planar surfaces;
      at least one substantially rectangular ferromagnetic plate, disposed parallel to each said planar surface of said centrally disposed nonconductive plate; and
      a plurality of concentrically arranged layers of insulation, primary windings, and ferromagnetic material circumferentially surrounding underlying layers, the plurality of layers arranged in a predetermined repeating pattern.

2. The electric generator according to claim 1, wherein said pattern comprises:
   a first layer of insulation covering underlying layers;
   a second layer of insulation covering said first layer of insulation;
   a first primary winding extending from said stator proximal end to said stator distal end;
   a third layer of insulation covering said first primary winding;
   a second primary winding extending from each said stator distal end back to each said stator proximal end, said third layer of insulation disposed between said first primary winding and said second primary winding;
   a fourth layer of insulation covering said second primary winding;
   a fifth layer of insulation covering said forth layer of insulation; and
   a first layer of ferromagnetic material circumferentially surrounding said fifth layer of insulation;

wherein said first and said second primary windings are formed from a single continuous conductor.

3. The electric generator according to claim 1, wherein each said stator further comprises an odd number of primary windings formed from a single continuous conductor having two ends, the first end extending from said stator proximal end and the second end extending from said stator distal end.

4. The generator according to claim 3, wherein said primary windings of diametrically opposite stator rows are electrically connected.

5. The generator according to claim 1, wherein each of said magnets comprises an extended rectangular bar formed of ferromagnetic material having a length approximately equal to the length of said rotor assembly.

6. The generator according to claim 1, wherein said magnets are arranged such that diametrically opposing magnets expose like poles to each said stator.

7. The generator according to claim 1, wherein said housing comprises a plurality of substantially square plates uniformly distributed in a row having a length approximately equal to said rotor assembly, said plates having a circular aperture centrally disposed therein, said aperture having an inner surface.

* * * * *